(12) United States Patent
Parker

(10) Patent No.: US 11,032,007 B1
(45) Date of Patent: Jun. 8, 2021

(54) THROUGH-WINDOW RELAY FOR HIGH-BAND RADIOFREQUENCY COMMUNICATIONS

(71) Applicant: DISH Wireless L.L.C., Englewood, CO (US)

(72) Inventor: Scott Parker, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 16/872,694

(22) Filed: May 12, 2020

(51) Int. Cl.
*H04B 10/00* (2013.01)
*H04B 10/29* (2013.01)
*H04B 10/40* (2013.01)

(52) U.S. Cl.
CPC .............. *H04B 10/29* (2013.01); *H04B 10/40* (2013.01)

(58) Field of Classification Search
CPC .......... H04B 10/2575; H04B 10/25752; H04B 10/25753; H04B 10/11; H04B 10/1123; H04B 10/1125; H04B 10/1129; H04B 10/40; H04B 10/1143; H04B 10/1149
USPC ........ 398/115, 116, 117, 118, 119, 120, 121, 398/124, 125, 126, 127, 128, 129, 130, 398/131, 135, 136, 158, 159
See application file for complete search history.

(56) References Cited

U.S. PATENT DOCUMENTS

| 8,014,678 B2 * | 9/2011 | Echols, Jr. ........... | H04B 10/801 398/115 |
| 8,503,886 B1 * | 8/2013 | Gunasekara ......... | H04B 10/116 398/172 |
| 2018/0026722 A1 * | 1/2018 | Ashrafi ................ | H04L 9/0858 398/115 |
| 2019/0081706 A1 * | 3/2019 | Neilson ............. | H04B 10/1143 |

* cited by examiner

*Primary Examiner* — Hanh Phan
(74) *Attorney, Agent, or Firm* — Kilpatrick Townsend & Stockton LLP

(57) ABSTRACT

Techniques are described for relaying of high-band radiofrequency communications through a window that would otherwise partially or completely block the communications. For example, embodiments include a pair of high-band-to-optical (HB2O) relays mounted on either side of a window. One of the relays receives a high-band radiofrequency (HB-RF) communication signal that is unable to pass through the window and converts the HB-RF communication signal to an optical communication signal. As the window is substantially transparent to visible-spectrum light, the optical communication signal can pass through the window. The optical communication signal is transmitted through the window to the other HB2O relay, and the other HB2O relay converts back to a HB-RF communication signal. Thus, HB-RF networks on either side of the window can be communicatively coupled via the optical communications provided by the pair of relays.

18 Claims, 4 Drawing Sheets

THROUGH-WINDOW RELAY FOR HIGH-BAND RADIOFREQUENCY COMMUNICATIONS

FIELD

This invention relates generally to communication networks, and, more particularly, to through-window relays for high-band radiofrequency communications.

BACKGROUND

Over the past decades, wireless communication technologies have experienced rapid increases in capability and ubiquity. Billions of devices are connected with networks making increasing demands on resources of those networks. Many approaches continually seek to meet those demands, including development of new technologies to utilize more of the wireless spectrum in new ways. For example, consumer wireless technology began to take off in the last two decades of the twentieth century with a move from so-called "first generation" (or "1G") analog to "second generation" (or "2G") digital wireless communications. The early 2000's saw a transition to packet-switching technology and global standardization with so-called "third generation" (or "3G") communications. Only few years later, consumer demand began to quickly rise for videoconferencing, streaming high-definition media, online gaming, and other bandwidth-hungry applications. In less than a decade, these new demands drove development and adoption of so-called "fourth generation" (or "4G") communication networks and new mobile devices capable of operating on these new networks. Since then, demand for bandwidth and other network resources has increased at an even faster pace with increased access to streaming of higher definition video, increased access to online gaming and videoconferencing applications, increasing number of Internet-of-Things (IoT) devices, and other technologies. Thus, even while 4G continues to be adopted, the world has begun another move to the so-called "fifth generation" (or "5G") standard.

The change from 2G to 3G involved changes in how bandwidth resources were used (e.g., changes in modulation), but both used similar portions of the radiofrequency spectrum (e.g., 850 Megahertz and 1900 Megahertz). The moves to 3G and 4G each involved additions of new portions of the spectrum, including various frequency bands between 600 Megahertz and 2.5 Gigahertz. Many 5G technologies also operate at frequencies below 6 Gigahertz. Notably, many of these frequencies tend to pass reasonably well through typical natural and man-made structures, such as walls, windows, and trees. As such, mobile wireless technologies have been able to support connectivity to consumers in urban environments, in their homes, in their offices, in their cars, and in other typical environments.

In contrast, part of the 5G revolution (sometimes called "high-band 5G") has involved introduction of millimeter-wave (also denoted as "mmWave," or "mmW") 5G technologies that exploit various higher frequency bands, such as between 24.250 Gigahertz and 52.600 Gigahertz. Use of such frequencies can support gigabit-per-second (Gbps) download speeds and other desirable features. However, such frequencies also have a number of limitations, including relatively small range (e.g., only around one mile) and difficulty passing through many typical structures. For example, many modern buildings (e.g., homes and office buildings) have windows made of low-emissivity ("Low-E") glass, which typically involves adding a microscopically thin coating to the glass that is substantially transparent to visible light, while blocking light in infrared and ultraviolet spectra. Such windows (and many other typical structures, such as the exterior building walls) tend to block transmission of most or all high-band 5G signals. Thus, despite the potential benefits of high-band 5G, these limitations have tended to frustrate plans for its deployment in homes, offices, vehicles, and other common environments.

BRIEF SUMMARY

Among other things, embodiments provide novel through-window relays for high-band radiofrequency communications that would otherwise be partially or completely blocked by the window. For example, embodiments include a pair of high-band-to-optical (HB2O) relays mounted on either side of a window. One of the relays receives a high-band radiofrequency (HB-RF) communication signal that is unable to pass through the window and converts the HB-RF communication signal to an optical communication signal. As the window is substantially transparent to visible-spectrum light, the optical communication signal can pass through the window. The optical communication signal is transmitted through the window to the other HB2O relay, and the other HB2O relay converts back to a HB-RF communication signal. Thus, HB-RF networks on either side of the window can be communicatively coupled via the optical communications provided by the pair of relays.

According to one set of embodiments, a high-band relay system is provided. The system includes a high-band-to-optical (HB2O) relay having: a high-band transceiver comprising a high-band antenna to transmit and receive high-band radiofrequency (HB-RF) communication signals via a wireless HB-RF communication network; an optical transceiver configured to transmit and receive optical communication signals via a wireless optical communication link oriented along a vector defined by optics of the optical transceiver; and a converter controller configured to translate received HB-RF communication signals into transmitted optical communication signals, and to translate received optical communication signals into transmitted HB-RF communication signal. In some such embodiments, the HB2O relay further includes a housing having mounting structure to mount the HB2O relay to a pane face of a window; the housing having, disposed therein, the high-band transceiver, the optical transceiver, and the converter; and the housing including an aperture integrated with the optics of the optical transceiver to permit optical communication between the wireless optical communication link external to the housing and the optical transceiver internal to the housing. In some such embodiments, the HB2O relay is a first HB2O relay of a pair of HB2O relays configured to mount on opposite faces of a window, to communicatively couple with respective HB-RF communication networks, and to be mounted relative to each other so that optics of their respective optical transceivers are oriented to optically couple to form the optical communication link along the vector through the window.

According to another set of embodiments, a method is provided for through-window relaying of high-band wireless communication signals. The method includes: receiving a first high-band radiofrequency (HB-RF) communication signal by a first high-band-to-optical (HB2O) relay via a first wireless HB-RF communication network on a first side of a window, the first HB-RF communications signal encoding a data stream; converting the first HB-RF communication signal to an optical communication signal by the first HB2O relay responsive to the receiving, such that the optical communication signal has the data stream encoded thereon; and transmitting the optical communication signal through the window by the first HB2O relay via a wireless optical communication link that optically couples the first HB2O relay with a second HB2O relay. Some embodiments of the method further include: receiving the optical communication signal by the second HB2O relay via the wireless optical communication link; converting the optical communication signal to a second HB-RF communication signal by the second HB2O relay responsive to the receiving the optical communication signal, such that the second HB-RF signal has the data stream encoded thereon; and transmitting the second HB-RF communication signal by the second HB2O relay via a second HB-RF communication network on a second side of the window.

According to another set of embodiments, a system is provided for through-window relaying of high-band wireless communication signals. The system includes one or more processors and non-transient processor-readable memory having instructions stored thereon, which, when executed, cause the one or more processors to perform steps. The steps include: receiving a first high-band radiofrequency (HB-RF) communication signal by a first high-band-to-optical (HB2O) relay via a first wireless HB-RF communication network, the first HB-RF communications signal encoding a data stream; converting the first HB-RF communication signal to an optical communication signal by the first HB2O relay responsive to the receiving, such that the optical communication signal has the data stream encoded thereon; and transmitting the optical communication signal by the first HB2O relay via a wireless optical communication link that optically couples the first HB2O relay with a second HB2O relay. In some embodiments, the steps further include receiving the optical communication signal by the second HB2O relay via the wireless optical communication link; converting the optical communication signal to a second HB-RF communication signal by the second HB2O relay responsive to the receiving the optical communication signal, such that the second HB-RF signal has the data stream encoded thereon; and transmitting the second HB-RF communication signal by the second HB2O relay via a second HB-RF communication network at least partially communicatively isolated from the first HB-RF communication network.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

Figure 1:
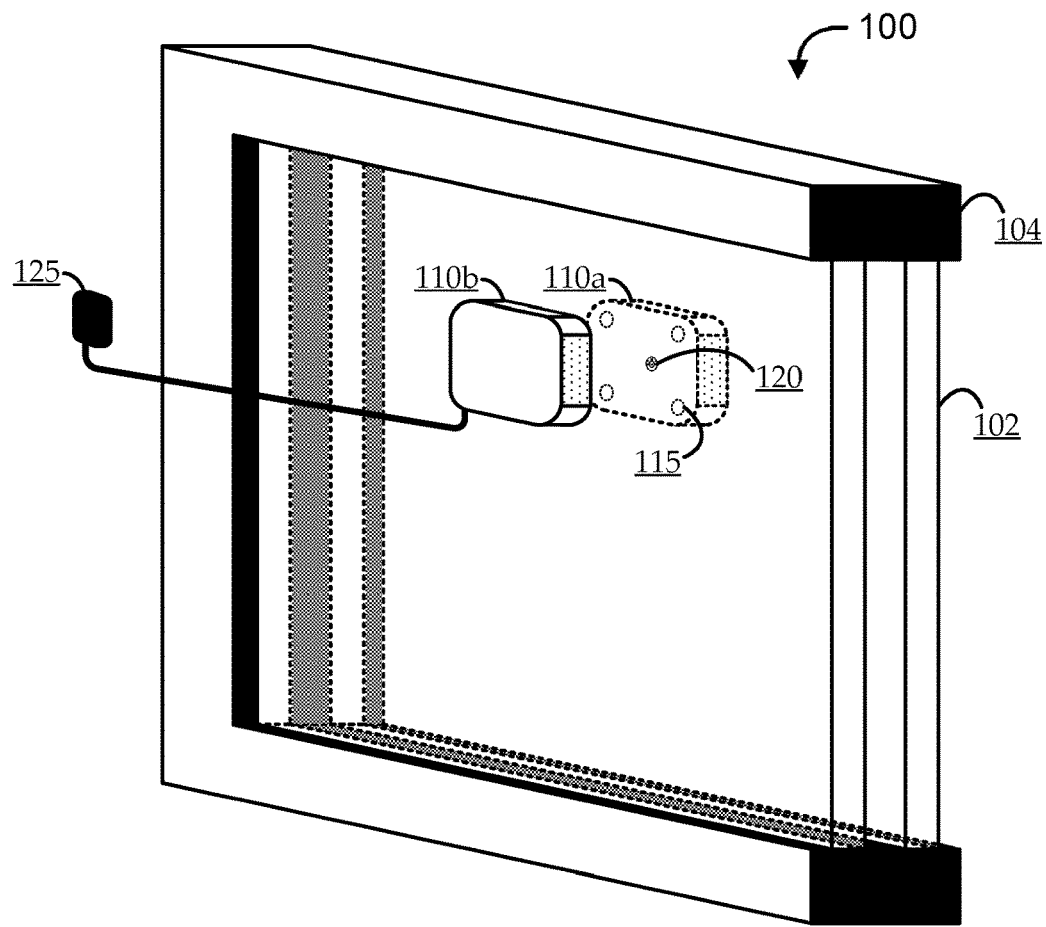
FIG. 1 shows an illustrative communication environment as a context for various embodiments described herein.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Conventionally, mobile wireless communications have tended to operate in frequency bands capable of passing through typical building structures, such as concrete walls and glass windows. Recently, mobile wireless technologies have begun to utilize portions of the radiofrequency spectrum for which those typical building structures can be partially or completely transparent. For example, wireless devices and networks are being designed around so-called "fifth generation" (or "5G") mobile wireless technologies. Part of the 5G revolution (sometimes called "high-band 5G") has involved introduction of millimeter-wave (also denoted as "mmWave," or "mmW") 5G technologies that exploit various higher frequency bands, such as between around 24 Gigahertz and 52 Gigahertz. Further technologies are already being designed to exploit frequencies of up to around 1 Terahertz.

These high-band technologies help support demands for higher bit-rates and increased capacity. However, such frequencies also have a number of limitations, including relatively small range and difficulty passing through many typical structures. For example, some mmWave 5G technologies have been shown to support gigabit-per-second (Gbps) download speeds, but the signals tend to have a range of only around one mile and tend to be unable to pass through typical exterior building walls and treated windows made of low-emissivity ("Low-E") glass (i.e., typically involving adding a microscopically thin coating to the glass that is substantially transparent to visible light, while blocking light in infrared and ultraviolet spectra). Thus, despite the potential benefits of high-band 5G and other similar technologies, the inability of those signals to reliably pass into and through typical structures continues to frustrate plans for its deployment in homes, offices, vehicles, and other common environments.

Embodiments described herein include systems and methods for implementing through-window relaying of high-band radiofrequency communications that would otherwise be partially or completely blocked by the window. For example, embodiments include a pair of high-band-to-optical (HB2O) relays mounted on either side of a window. One of the relays receives a high-band radiofrequency (HB-RF) communication signal that is unable to pass through the window and converts the HB-RF communication signal to an optical communication signal. As the window is substantially transparent to visible-spectrum light, the optical communication signal can pass through the window. The optical communication signal is transmitted through the window to the other HB2O relay, and the other HB2O relay converts back to a HB-RF communication signal. Thus, HB-RF networks (e.g., mmWave 5G networks) on either side of the window can be communicatively coupled via the optical communications provided by the pair of relays.

Turning to FIG. 1, an illustrative communication environment 100 is shown as a context for various embodiments described herein. Many modern building structures include exterior structures that tend to block certain wireless transmissions. For example, buildings may have thick exterior walls embedded with metal conduit and reinforcing structures, windows treated for energy efficiency, etc. The illustrated environment 100 shows an example portion of an exterior wall structure 104 with an exterior window 102 installed therein. The illustrated window 102 is shown as having two window panes separated by an air (or argon, or other gas) gap. However, embodiments described herein can operate in context of any suitable type of window 102. The window 102 may, for example, be a so-called low-emissivity ("Low-E") window, for which the glass is treated by adding a microscopically thin coating that is substantially transparent to visible light, while blocking light in infrared and ultraviolet spectra. Such windows may range in thickness. For example, some typical residential exterior windows can be around one-quarter inch thick (e.g., a double-pane window having two sheets of glass, each of less than one-eighth-inch thickness), and some typical commercial exterior windows can be around one inch thick (e.g., a double-pane window having two sheets of glass, each of one-quarter-inch thickness, separated by a half-inch gap filled with air or other gas).

The illustrated environment 100 shows a pair of high-band-to-optical (HB2O) relays 110 mounted on either side of the window 102. For example, a first HB2O relay 110a is mounted to an exterior face of an exterior pane of the window 102, and a second HB2O relay 110b is mounted to an interior face of an interior pane of the window 102 (or the same pane of the window 102 for a single-pane window). It is generally assumed herein that there are mobile wireless devices on at least one side of the window 102 that desire to communicate with nodes of at least a high-band radiofrequency (HB-RF) communication network on the opposite side of the window 102. For example, the mobile wireless devices can include smart phones, laptop and tablet computers, wearable devices, and/or any other suitable devices configured to communicate with such a HB-RF communication network. It is further generally assumed herein that the building structures (walls, windows, etc.) are such that communications with the HB-RF communication network are substantially (e.g., mostly or completely) blocked. As such, for example, a smart phone inside the building (interior to the window 102) is effectively unable to communicate HB-RF signals with another HB-RF communication network node (e.g., another device, cellular tower, etc.) outside the building. As described herein, the pair of HB2O relays 110 can facilitate HB-RF communications between the interior and the exterior of such a structure by forming an intermediate wireless optical link through the window 102.

Figure 2:
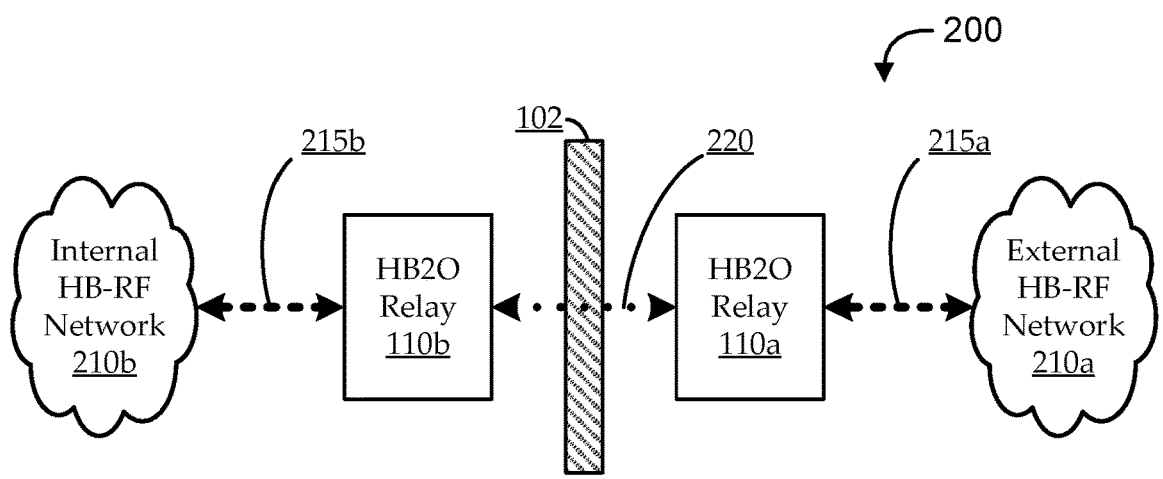
FIG. 2 shows an illustrative communication network context with a pair of high-band-to-optical (HB2O) relays on either side of a window.

Turning briefly to FIG. 2, an illustrative communication network context 200 is shown. As in FIG. 1, the illustrated context 200 shows a pair of HB2O relays 110 on opposite sides of a window 102. A first HB2O relay 110a is shown as mounted at an exterior side of the window 102 and in communication with a first HB-RF communication network 210a, such that the first HB2O relay 110a can communicate HB-RF communication signals over at least a first wireless HB-RF communication link 215a with the HB-RF communication network 210a. A second HB2O relay 110b is shown as mounted at an interior side of the window 102 and in communication with a second HB-RF communication network 210b, such that the second HB2O relay 110b can communicate HB-RF communication signals over at least a second wireless HB-RF communication link 215b with the HB-RF communication network 210b. As noted above, it is assumed that the communications between the first HB-RF communication network 210a and the second HB-RF communication network 210b are effectively blocked by the window 102 and other structures, such that the two HB-RF communication networks 210 are effectively communicatively isolated. Indeed, some amount of HB-RF communication signals may be able to pass through the building structures, but it is assumed that the signal is sufficiently blocked or attenuated as to be considered effectively blocked. For example, as used herein, communications may be considered as effectively or substantially blocked (e.g., that the window 102 is substantially opaque to certain frequencies, etc.) when blocking or attenuation of signals is at a level where direct communications between the first and second HB-RF communication networks 210 cannot support a desired minimum quality of service.

According to embodiments described herein, the first HB2O relay 110a can receive a HB-RF communication signal from the external HB-RF communication network 210a via the first wireless HB-RF communication link 215a (e.g., from a cellular tower, a mobile wireless device, etc.). In response to receiving the signal, the first HB2O relay 110a can convert the signal into an optical communication signal. For example, a data stream encoded onto the HB-RF communication signal can be re-encoded according to an optical communications protocol, the HB-RF communication signal can be frequency translated (e.g., up-converted) to the optical frequency band, etc. The optical communication signal can be transmitted by the first HB2O relay 110a to the second HB2O relay 110b via at least one intermediate wireless optical communication link 220 established between the first and second HB2O relays 110. The second HB2O relay 110b can receive the optical communication signal and can convert the signal back to a HB-RF communication signal. The second HB2O relay 110b can then transmit the HB-RF communication signal over the internal HB-RF communication network 210b via a second wireless HB-RF communication link 215b (e.g., to a mobile wireless device, etc.). Communications can similarly flow in the opposite direction from internal transmission nodes to external receiving nodes. For example, a smart phone inside a building can transmit a HB-RF communication signal over the internal HB-RF communication network 210b (via the second wireless HB-RF communication link 215b) to the second HB2O relay 110b. The second HB2O relay 110b can receive the signal, convert the signal to an optical communication signal, and transmit the optical communication signal to the first HB2O relay 110a. The first HB2O relay 110a can convert the optical communication signal back to a HB-RF communication signal, and can transmit the HB-RF communication signal to a cellular tower or antenna external to the building via the wireless HB-RF communication link 215a of the external HB-RF communication network 210a.

As used herein, the term "window" is intended generally to include any structure that is substantially transparent to at least a portion of the optical spectrum. For example, a typical window may be made of glass and substantially transparent to at least the full visible (red-green-blue) spectrum. Other types of windows may be designed to permit or block passage of certain portions of the optical spectrum, such as ultraviolet. In plain usage, the term window can also include structure supporting the panes. As such, references herein to embodiments being mounted on a window are intended generally to include any suitable type of mounting to any suitable portion of the window 102a, while still supporting transmission of optical information through the window 102. Each HB2O relay 110 can include any suitable mounting structures, generally illustrated as mounting structures 115. In one implementation, the mounting structures 115 include or support suction cups to removably fix each HB2O relay 110 to a glass face of the window 102. In another implementation, the mounting structures 115 include or support magnets that magnetically couple the HB2O relays 110 to each other through the window 110. In another implementation, the mounting structures 115 include or support screws, nails, or any suitable mechanical, chemical, or other fastener to couple the HB2O relay 110 to a non-glass portion of the window 102 (e.g., to a wood or metal widow frame, window sill, louver, etc.). For example, the window 102 glass itself may be more likely to move than other exterior structures due to environmental sound waves, wind, rain, etc.; and such movement may impact stability of the intermediate wireless optical link through the window 102. As such, it can be preferable in certain implementations to support mounting of the HB2O relays 110 to structures other than the glass itself. Still, such implementations of the HB2O relays 110 are designed to support optical communications through the optically transmissive (e.g., glass) portion of the window 102 despite being at least partially mounted on a structure that is opaque (e.g., concrete, wood, metal, etc.).

Returning to FIG. 1, the illustrated HB2O relays 110 also include optical structures 120 to support optical communication through the window 102. The optical structures 120 can include any suitable lenses, mirrors, apertures, and/or other structures to support optical features, such as transmission, receipt, filtering, focus, alignment, etc. Embodiments of the mounting structures 115 are designed to ensure proper and stable positioning of the optical structures 120. For example, proper mounting of the HB2O relays 110 can include positioning and aligning of the HB2O relays 110 relative to each other on opposite sides of the window 102 so as to align the optical structures 120 to support a stable wireless optical communication link between the HB2O relays 110. The optical structures 120 can include different structures to support different implementation contexts and/or features. In some implementations, the optical structures 120 include particular components (e.g., different types of lenses, filters, apertures, etc.) designed to support different window thicknesses, materials, etc. In other implementations, the optical structures 120 include components to support automatic and/or manual alignment, such as to mechanically steer the optical structures 120 for formation of the desired intermediate wireless optical communication link.

Embodiments of the HB2O relays 110 can also include, or support coupling with, any suitable power structures 125. In the illustrated embodiment, the second HB2O relay 110b is shown as having a power plug to plug into a wall outlet for line power. Alternatively, the HB2O relay 110b can be powered by internal or external batteries, hard-wires into the building's electrical system, or in any other suitable manner. The HB2O relay 110a may be powered in the same or different ways. In some implementations, the HB2O relay 110a includes power structures 125 that support wireless charging, and the HB2O relay 110 receives some or all of its power wirelessly from power structures 125 of the second HB2O relay 110b.

Some embodiments are implemented substantially symmetrically. For example, the pair of HB2O relays 110 are illustrated in FIG. 1 to look substantially identical. In some such embodiments, the first HB2O relay 110a and the second HB2O relay 110b are identical devices that may operate in a substantially identical manner (e.g., they are effectively interchangeable). In other such embodiments, the HB2O relays 110 are designed identically, but each is separately configurable according to its use. For example, one HB2O relay 110 may be hardware-configurable and/or software-configurable for external use by configuring the device to transmit and/or receive at a particular power level, configuring mounting structures 115 for exterior mounting, configuring power structures 125 for external availability of power (e.g., for solar panels, for wireless charging, etc.), and/or in any other suitable manner; while the other HB2O relay 110 may be hardware-configurable and/or software-configurable for internal use by configuring the device to transmit and/or receive at a particular (e.g., lower) power level, configuring mounting structures 115 for interior mounting, configuring power structures 125 for internal availability of power (e.g., for line power, etc.), and/or in any other suitable manner. In other embodiments, each HB2O relay 110 may be particularly designed (e.g., structurally, hardware- and/or software-optimized, etc.) for its intended use. For example, each HB2O relay 110 may be particularly designated as an exterior model or an interior model. Similarly, while the HB-RF communication networks 210 and the wireless HB-RF communication links 215 are labeled using the same reference numerals on both sides of the window 102 in FIG. 2, those networks and links may or may not be identical. In some embodiments, the exterior HB-RF communication network 210 (and its corresponding wireless HB-RF communication links 215) are part of a provider-side network operated by a cellular, or other mobile wireless network provider; and the interior HB-RF communication network 210 (and its corresponding wireless HB-RF communication links 215) are part of a private wireless local area network (WLAN) operated by a local entity (e.g., a resident individual or entity in the building, etc.). In some such implementations, one or both HB2O relays 110 can include and/or support additional features of routers, switches, and other network nodes, such as to provide network address translation, firewalls, virtual tunnels, etc. Further, while some embodiments are illustrated and discussed with reference to a pair of devices, some implementations can include more than two HB2O relays 110. For example, a single external HB2O relay 110 may provide through-window wireless optical communication links to multiple internal HB2O relays 110. In such an implementation, each internal HB2O relay 110 can be configured to support respective portions of traffic (e.g., using additional load balancing and/or other features), to support respective radio technologies (e.g., frequency bands, protocols, etc.), to support redundancy, and/or for any other suitable purpose.

Figure 3:
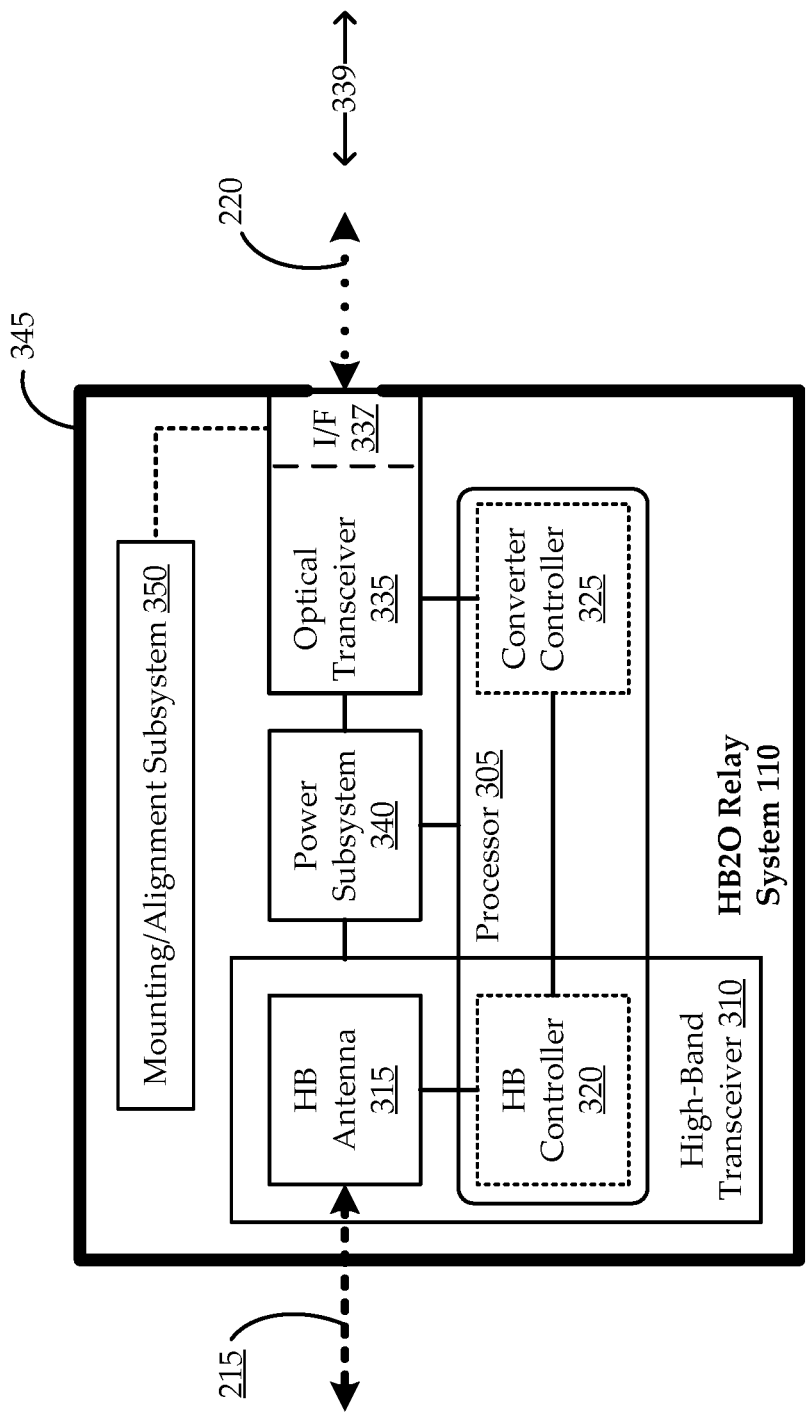
FIG. 3 shows a block diagram of an illustrative HB2O relay, according to various embodiments.

FIG. 3 shows a block diagram of an illustrative HB2O relay 110, according to various embodiments. The HB2O relay 110 can be an implementation of the HB2O relays 110 of FIGS. 1 and 2. Embodiments of the HB2O relay 110 include a high-band transceiver 310, an optical transceiver 335, and a converter controller 325. Embodiments of the high-band transceiver 310 include a high-band antenna 315 to transmit and receive high-band radiofrequency (HB-RF) communication signals via a wireless HB-RF communication network. For the sake of context, the high-band antenna 315 is shown communicating via a wireless HB-RF communication link 215 (e.g., as described with reference to FIG. 2). In some embodiments, the high-band antenna 315 is an antenna array, such as a slot-array or phased array antenna. In some embodiments, the antenna is adapted to communicate according to a mmWave 5G mobile wireless technology, including in one or more corresponding frequency bands and specifications, according to one or more protocol specifications, in compliance with one or more power specifications, etc.

In some embodiments, the high-band transceiver 310 further includes a high-band controller 320. Some embodiments of the high-band controller 320 condition signals for transmission and/or receipt, such as by performing beamforming, precoding, filtering, modulation and/or coding, frequency translation, encrypting and/or decrypting, packetizing, and/or any other suitable features. Some embodiments direct operation of the high-band antenna 315, such as by adjusting gain, applying beam weighting, etc. Some embodiments of the high-band controller 320 implement software-defined networking (SDN) features. For example, SDN features of the high-band controller 320 can be used to hop between frequencies, support multiple radio technologies, etc. Such features (or similar features) can also be adapted to provide security by permitting remote configuration of the HB2O relay 110 to stop passing through some or all communications. For example, the inability of mmWave 5G signals to pass into or out of a particular building structure can be exploited, such that mmWave 5G communications are effectively cut off when the HB2O relay 110 is not operating.

In some embodiments, the high-band transceiver 310 includes multiple antennas to support one or more different communication technologies. For example, at least one antenna is the high-band antenna 315 to support at least one high-band radio technology, and other antennas are optimized for other cellular technologies (e.g., 3G or 4G), satellite communications, wireless fidelity (WiFi) communications, etc. In some such embodiments, the high-band controller 320 is configured to manage operation and/or configuration of the different antennas. Some such embodiments can further be configured to support antenna modularity, such as including ports and/or other structures to support adding antennas, replacing antennas, etc.

Embodiments of the optical transceiver 335 transmit and receive optical communication signals via a wireless optical communication link 220 oriented along a vector 339 defined by optics of the optical transceiver 335. The optical transceiver 335 can include a wireless optical interface 337 having any suitable optics (e.g., the optical structures 120 described with reference to FIG. 1) to support wireless optical communications in any suitable optical frequency. Implementations of the wireless optical interface 337 can operate in the visible frequency band (e.g., corresponding to around 390-750 nanometers) and/or the near-infrared frequency band (e.g., corresponding to around 750-1600 nanometers) by modulating (e.g., pulsing) light emitting diodes (LEDs), laser transmitters, or the like. The wireless optical interface 337 can also include any suitable wireless optical receiver structures, such as photodetectors. In some implementations, the transmitting and/or receiving portions of the wireless optical interface 337 include lenses, mirrors, apertures, etc. to help steer the optical path, focus the optical path, collimate the optical path, filter the optical path, etc. In context of a pair of HB2O relays 110, the wireless optical communication link travels over a short distance (e.g., typically on the order of one-quarter inch to one inch), and the mounting structures 115 of the HB2O relays 110 can be designed to provide and maintain stable positioning of the optical structures 120, shielding from ambient illumination, etc. As such, even a relatively low-power and non-collimated light beam can be sufficient in some implementations to provide a reliable high-band wireless optical communication link 220. The vector 339 is illustrated as a two-way arrow, as communications are assumed to be bi-directional. Communications transmitted by the optical transceiver 335 can be oriented along the vector 339 in a direction away from the HB2O relay 110, and communications received by the optical transceiver 335 can be oriented along the vector 339 in the opposite direction toward the HB2O relay 110.

Embodiments of the converter controller 325 translate between HB-RF communication signals and optical communication signals. For example, the HB2O relay 110 can translate received HB-RF communication signals into transmitted optical communication signals for communications traveling in one direction (e.g., from a first HB-RF communication network 210 to a second HB-RF communication network 210), and the HB2O relay 110 can translate received optical communication signals into transmitted HB-RF communication signals for communications traveling in the opposite direction (e.g., from the second HB-RF communication network 210 to the first HB-RF communication network 210). The converter controller 325 can perform the translation in any suitable manner, depending on characteristics of the high-band transceiver 310 and the optical transceiver 335. In some implementations, the translation involves frequency-translating from a receiving band to a transmission band, and driving transmission according to the frequency-translated signal. For example, the HB2O relay 110 receives a HB-RF communication signal at a mmWave frequency of around 50 Gigahertz (e.g., corresponding to a wavelength of around 6 millimeters), up-converts the signal to a visible-spectrum frequency of around 600 Terahertz (e.g., corresponding to a wavelength of around 500 nanometers), and modulates (e.g., pulses) the output of an LED according to the up-converted signal. In other implementations, the converter controller 325 performs additional signal processing of the communication signals. For example, the converter controller 325 can amplify, filter, modulate, encode, and/or otherwise adapt or optimize the signal for transmission via the wireless optical interface 337 and/or for receipt via the wireless optical interface 337. In other implementations, the converter controller 325 performs additional data processing of the communication signals. For example, the communication signals encode data streams (as used herein, a "data stream," or the like," is intended generally to include any data encoded in any suitable manner on a communication signal, and is not intended to be limited to any particular type of data stream encoding, streaming protocol, etc.). Implementations of the converter controller 325 can process the data, such as by decoding the data from a received signal, encoding the data onto a signal for transmission, encrypting or decrypting the data, compressing or decompressing the data, decoding or encoding metadata, etc.

In some embodiments, the HB2O relay 110 includes one or more processors 305. The one or more processors can implement the converter controller 325 and/or the high-band controller 320. For example, the converter controller 325 and the high-band controller 320 can both be implemented on a same processor. Embodiments of the processor(s) 305 can be implemented as, or can include, a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof.

Embodiments of the HB2O relay 110 include a power subsystem 340 (e.g., including the power structures 125 described with reference to FIG. 1). The power subsystem 340 can include any suitable components for providing power to the components of the HB2O relay 110, such as to the processor(s) 305, the high-band transceiver 310, and the optical transceiver 335. In some embodiments, the power subsystem 340 includes batteries, a battery pack, rechargeable power storage, and/or other suitable on-board power sources. In other embodiments, the power subsystem 340 includes components to support receipt of power from external power sources. For example, implementations can include cords, ports, cables, mounting structures, etc. to support plugging the HB2O relay 110 into line power (e.g., via a plug for a wall socket), to support hard-wiring the HB2O relay 110 to a power grid (e.g., a building's or vehicle's power system), to support coupling the HB2O relay 110 with a solar power system, to support wireless receipt of power (e.g., according to a wireless charging protocol, or the like), etc. In other embodiments, the power subsystem 340 includes components to deliver power to other devices. For example, the power subsystem 340 can include a wireless power transmitter to wirelessly transmit power to another HB2O relay 110 and/or other device.

Embodiments of the HB2O relay 110 include a housing 345. The housing 345 can be any suitable unitary structure, or assembly of structures, to at least partially house components of the HB2O relay 110. In some implementations, the housing 345 is essentially a box made of plastic and/or other suitable materials and shaped and sized to house at least the processor(s) 305, the power subsystem 340, the high-band transceiver 310, and the optical transceiver 335. In some implementations, certain components can be external to, or exposed by, the housing 345. For example, the power subsystem 340 can include ports, cables, solar cells, and/or other components that may not be fully within the housing 345; and the high-band transceiver 310 can include one or more antenna components that may not be fully within the housing 345. Embodiments of the housing 345 include an opening (e.g., an aperture) to expose components of the optical transceiver 335 for transmission and receipt of optical information. In some such embodiments, the opening is covered by a transparent material, a lens, an adjustable aperture, or the like.

Embodiments of the HB2O relay 110 include a mounting/alignment subsystem 350. In some embodiments, the mounting/alignment subsystem 350 includes mounting structures to mount the housing 345 and/or any other components of the HB2O relay 110 to any suitable structure, such as to a glass face, window frame structure, wall, etc. For example, the mounting/alignment subsystem 350 can include or support magnets, suction cups, nails, screws, adhesive, and/or any other suitable mechanical, chemical, and/or other fastener. In some embodiments, the mounting/alignment subsystem 350 has structures for facilitating manual alignment of the housing 345 and/or any other components of the HB2O relay 110. In some embodiments, the mounting/alignment subsystem 350 has structures for facilitating automatic alignment (e.g., self-alignment) of the housing 345 and/or any other components of the HB2O relay 110. In some implementations, the mounting/alignment subsystem 350 includes one or more magnets arranged, so that when a pair of HB2O relays 110 are positioned opposite one another on either side of a window, the magnets form a magnetic coupling between the pair of HB2O relays 110 through the window, thereby holding the HB2O relays 110 in place. For example, both HB2O relays 110 may have magnets, or one HB2O relay 110 has magnets and the other HB2O relay 110 has magnetic material. In some such implementations, multiple magnets are arranged, so that the magnetic coupling formed between a pair of HB2O relays 110 also automatically aligns the respective wireless optical interfaces 337 to support forming a wireless optical communication link through the window.

Some embodiments of the mounting/alignment subsystem 350 are coupled with the optical transceiver 335 to facilitate manual and/or automatic alignment of the wireless optical communication link. Some implementations provide audible, visual, or other feedback to an installer to indicate successful manual alignment. For example, as an installer is lining up one HB2O relay 110 relative to another HB2O relay 110 (e.g., on an opposite side of a window, etc.), the HB2O relay 110 may beep, illuminate LEDs or otherwise indicate to the installer when the wireless optical interfaces 337 of the HB2O relays 110 are properly aligned, and/or adjustments to be made to the alignment (e.g., an indication to shift one of the HB2O relays 110 is a particular direction, etc.). Such feedback may be driven by one or both HB2O relays 110 sending test optical signals over the wireless optical communication link and measuring signal strength, bit errors, etc. Some implementations include one or more mechanisms to point beams of optical communications to form the wireless optical communication link. In one such embodiment, when the HB2O relays 110 are sufficiently aligned (e.g., manually, by magnets or other structures, etc.), the mounting/alignment subsystem 350 can steer optics on one or both HB2O relays 110 so that their respective communications are aligned as closely as practical with the desired vector 339. The beam pointing mechanisms can include any suitable mechanical pointing mechanisms (e.g., motor-driven optical components, micro-electromechanical systems (MEMs), etc.) and/or logical pointing mechanisms (e.g., phased beam arrays that can point the beam using beam-weighting techniques).

Figure 4:
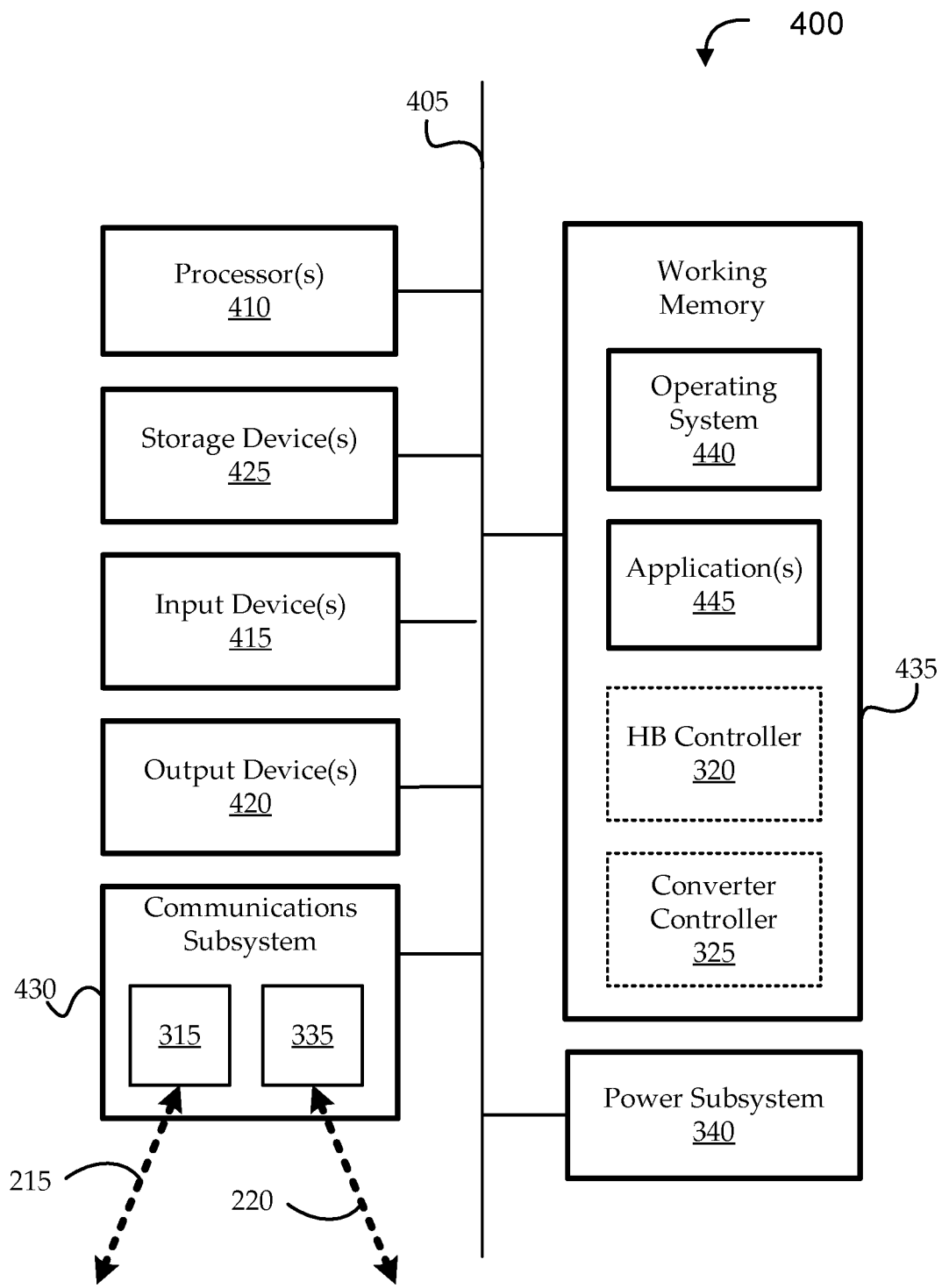
FIG. 4 provides a schematic illustration of one embodiment of a computer system that can implement various system components and/or perform various steps of methods provided by various embodiments.

Embodiments of the HB2O relays 110, or components thereof, can be implemented on, and/or can incorporate, one or more computer systems, as illustrated in FIG. 4. FIG. 4 provides a schematic illustration of one embodiment of a computer system 400 that can implement various system components and/or perform various steps of methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown including hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, buttons, knobs, switches, keypads, touchscreens, remote controls, and/or the like; and one or more output devices 420, which can include, without limitation, displays, indicators, gauges, and/or the like. In some implementations, the computer system 400 is configured to interface with additional computers (instead of, or in addition to human users), such that the input devices 415 and/or output devices 420 include various physical and/or logical interfaces (e.g., ports, etc.) to facilitate computer-to-computer interaction and control. For example, one computer system 400 can implement one HB2O relay 110, and another computer system 400 can implement another HB2O relay 110, and the two computer systems 400 can interact. Alternately, a single computer system 400 can be considered as implementing two or more HB2O relays 110 (e.g., the HB2O relays 110 are implemented to share computational resources and/or functions).

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 425 include the storage subsystem 130.

In some embodiments, the computer system 400 also includes one or more power subsystems 340. As described herein, the power subsystem 340 can be implemented in various ways. Some implementations provide power as supplied by line power (e.g., via a power plug plugged into a wall outlet, hard-wiring into a building's electrical system, or the like), and/or as supplied by one or more batteries. Other implementations include solar panels to locally generate power. Other implementations include wireless charging components, such as to receive power wirelessly through a window.

The computer system 400 can also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. As described herein, the communications subsystem 430 supports at least one high-band radiofrequency communication technology and at least one optical communication technology. For example, as illustrated, the communications subsystem 430 can include at least a high-band antenna 315 and an optical transceiver 335. The high-band antenna 315 can support communications via one or more wireless high-band communication links 215, and the optical transceiver 335 can support communications via one or more wireless optical communications link 220.

In many embodiments, the computer system 400 will further include a working memory 435, which can include a RAM or ROM device, as described herein. The computer system 400 also can include software elements, shown as currently being located within the working memory 435, including an operating system 440, device drivers, executable libraries, and/or other code, such as one or more application programs 445, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods.

In some embodiments, the operating system 440 and the working memory 435 are used in conjunction with the one or more processors 410 to implement some or all of a HB2O relay 110. For example, the operating system 440 and the working memory 435 are used in conjunction with the one or more processors 410 to implement some or all features of the high-band controller 320 and converter controller. In some embodiments, the working memory 435 includes non-transient, processor-readable memory having instructions stored thereon, which, when executed, cause the one or more processors 410 to perform steps including: receiving a first HB-RF communication signal via a first wireless HB-RF communication network, the first HB-RF communications signal encoding a data stream; converting the first HB-RF communication signal to an optical communication signal, such that the optical communication signal has the data stream encoded thereon; and transmitting the optical communication signal via a wireless optical communication link to another HB2O relay. In other embodiments, the steps can include: receiving an optical communication signal via a wireless optical communication link, the optical communication signal having a data stream encoded thereon; converting the optical communication signal to a HB-RF communication signal, such that the HB-RF signal has the data stream encoded thereon; and transmitting the HB-RF communication signal via a HB-RF communication network.

A set of these instructions and/or codes can be stored on a non-transitory computer-readable storage medium, such as the non-transitory storage device(s) 425 described above. In some cases, the storage medium can be incorporated within a computer system, such as computer system 400. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 400 and/or can take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which can be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 can cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media can be involved in providing instructions/code to processor(s) 410 for execution and/or can be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 400.

The communications subsystem 430 (and/or components thereof) generally will receive signals, and the bus 405 then can carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
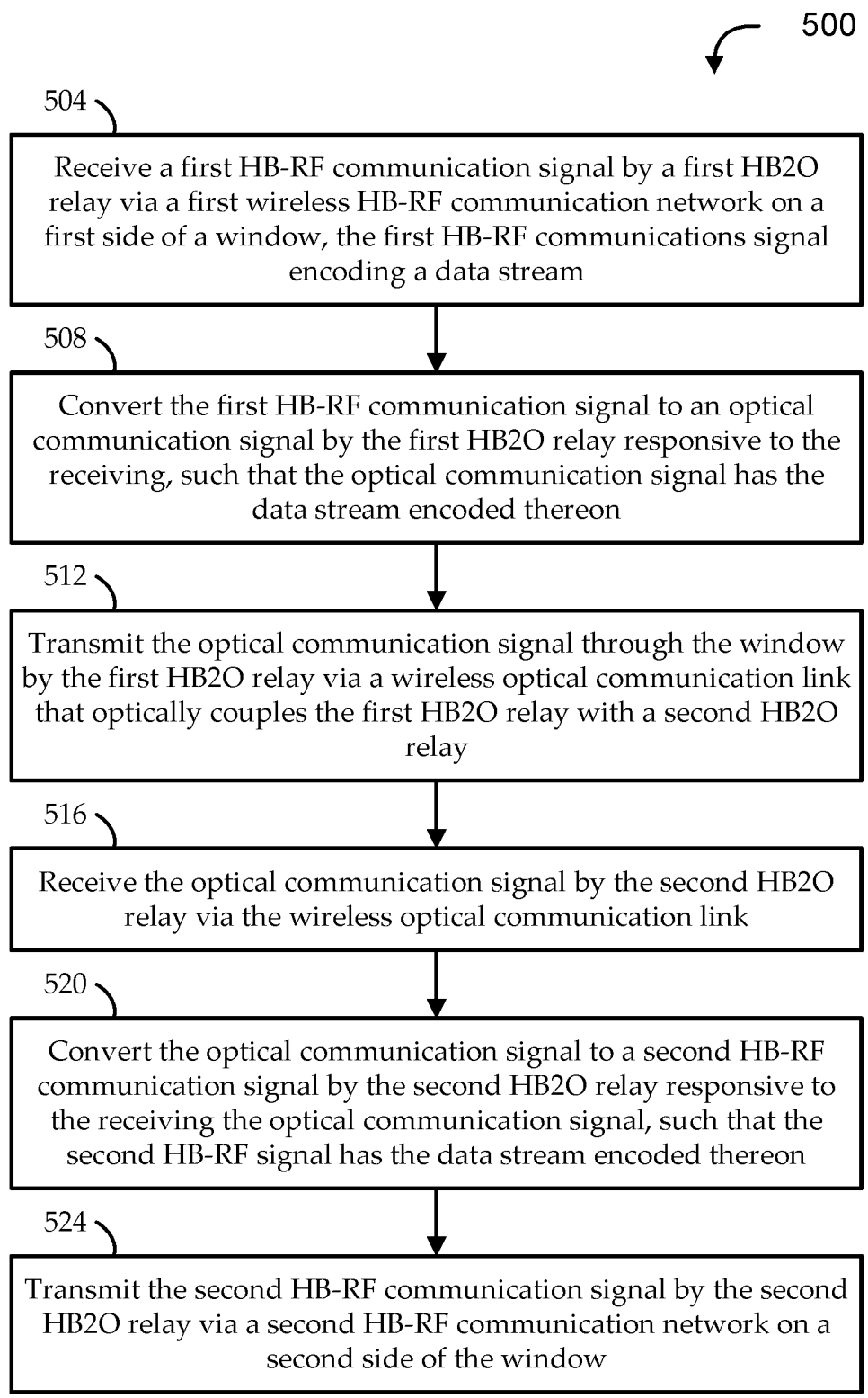
FIG. 5 shows a flow diagram of an illustrative method for through-window relaying of high-band wireless communication signals, according to various embodiments.

Systems including those described above can be used to implement various methods. FIG. 5 shows a flow diagram of an illustrative method 500 for through-window relaying of high-band wireless communication signals, according to various embodiments. Embodiments of the method begin at stage 504 by receiving a first high-band radiofrequency (HB-RF) communication signal by a first high-band-to-optical (HB2O) relay via a first wireless HB-RF communication network on a first side of a window, the first HB-RF communications signal encoding a data stream. At stage 508, embodiments can convert the first HB-RF communication signal to an optical communication signal by the first HB2O relay responsive to the receiving, such that the optical communication signal has the data stream encoded thereon. At stage 512, embodiments can transmit the optical communication signal through the window by the first HB2O relay via a wireless optical communication link that optically couples the first HB2O relay with a second HB2O relay. In some embodiments, the HB-RF communication signal is received in a first frequency band, and the optical communication signal is transmitted in a second frequency band; and the window is substantially opaque to the first frequency band and substantially transparent to the second frequency band.

Some embodiments of the method 500 continue at stage 516 by receiving the optical communication signal by the second HB2O relay via the wireless optical communication link. At stage 520, embodiments can convert the optical communication signal to a second HB-RF communication signal by the second HB2O relay responsive to the receiving the optical communication signal, such that the second HB-RF signal has the data stream encoded thereon. At stage 524, embodiments can transmit the second HB-RF communication signal by the second HB2O relay via a second HB-RF communication network on a second side of the window. In some embodiments, the first HB-RF communication signal and the second HB-RF communication signal are transmitted in a same frequency band. For example, the first HB-RF communication signal is received by the first HB2O relay as a mmWave 5G communication and converted to the optical communication signal in the visible spectrum; and the second HB2O relay converts the optical communication signal to the second HB-RF communication signal for transmission as a mmWave 5G communication.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A high-band relay system comprising:
   a first high-band-to-optical (HB2O) relay comprising:
   a high-band transceiver comprising a high-band antenna to transmit and receive high-band radiofrequency (HB-RF) communication signals via a wireless HB-RF communication network;
   an optical transceiver configured to transmit and receive optical communication signals via a wireless optical communication link oriented along a vector defined by optics of the optical transceiver; and
   a converter controller configured to translate received HB-RF communication signals into transmitted optical communication signals, and to translate received optical communication signals into transmitted HB-RF communication signals; and
   an alignment subsystem, comprising a first set of at least four magnets arranged in a rectangular pattern, that interfaces with a second set of at least four magnets of a second HB2O relay through a barrier, wherein:
   the optical transceiver transmits and receives optical communication signals within the rectangular pattern formed by the first set of magnets; and
   the first set of at least four magnets and the second set of at least four magnets are configured to:
   cooperatively provide alignment between the optical transceiver and a second optical transceiver of the second HB2O relay; and
   hold the first HB2O relay and the second HB2O relay in place against opposite sides of the barrier.

2. The system of claim 1, wherein:
   the HB2O relay further comprises a housing having mounting structure to mount the HB2O relay to a pane face of a window, wherein the window is the barrier;
   the housing has, disposed therein, the high-band transceiver, the optical transceiver, and the converter controller; and
   the housing comprises an aperture integrated with the optics of the optical transceiver to permit optical communication between the wireless optical communication link external to the housing and the optical transceiver internal to the housing.

3. The system of claim 2, wherein:
   the HB-RF communication signals are communicated in a first frequency band, and the optical communication signals are communicated in a second frequency band; and
   the window is substantially opaque to the first frequency band and substantially transparent to the second frequency band.

4. The system of claim 1, wherein the HB2O relay is a first HB2O relay, such that the high-band transceiver is a first high-band transceiver, the optical transceiver is a first optical transceiver, and the converter controller is a first converter controller, and further comprising:
   a second HB2O relay comprising a second high-band transceiver, a second optical transceiver, and a second converter controller,
   wherein the first HB2O relay is configured to mount to a first face of a window and to communicatively couple with a first HB-RF communication network,
   the second HB2O relay is configured to mount to a second face of the window opposite the first face of the window and to communicatively couple with a second HB-RF communication network communicatively isolated from the first HB-RF communication network at least by the window,
   such that mounting the first HB2O relay relative to the second HB2O relay positions the optics of the first optical transceiver to optically couple with the optics of the second optical transceiver to form the wireless optical communication link along the vector through the window.

5. The system of claim 4, wherein:
   the first HB-RF communication network operates in a first frequency band; and
   the second HB-RF communication network operates in a second frequency band that is different from the first frequency band.

6. The system of claim 4, wherein:
   the first HB2O relay comprises a first power subsystem configured to receive line power and/or battery power; and
   the second HB2O relay comprises a second power subsystem configured to receive power wirelessly through the window from the first power subsystem.

7. The system of claim 1, wherein:
   the high-band transceiver further comprises a high-band controller to direct communications via the high-band antenna, the high-band antenna being a millimeter-wave active antenna array.

8. The system of claim 7, wherein:
the high-band controller is configured as a software-defined networking (SDN) controller to dynamically configure operation of the high-band antenna.

9. The system of claim 1, wherein:
the high-band transceiver comprises a plurality of antennas, each to communicate in accordance with a respective one of a plurality of frequency bands, at least one of the plurality of antennas being the high-band antenna.

10. A method for through-window relaying of high-band wireless communication signals, the method comprising:
mounting a first high-band-to-optical (HB2O) relay to a window using an alignment subsystem of the first HB2O relay, wherein the alignment subsystem comprises a first set of at least four magnets arranged in a rectangular pattern, that interfaces with a second set of at least four magnets of a second HB2O relay through the window, wherein:
an optical transceiver transmits and receives optical communication signals within the rectangular pattern formed by the first set of magnets; and
the first set of at least four magnets and the second set of at least four magnets are configured to:
cooperatively provide alignment between the optical transceiver and a second optical transceiver of the second HB2O relay; and
hold the first HB2O relay and the second HB2O relay in place against opposite sides of the barrier;
receiving a first high-band radiofrequency (HB-RF) communication signal by the first HB2O relay via a first wireless HB-RF communication network on a first side of the window, the first HB-RF communications signal encoding a data stream;
converting the first HB-RF communication signal to an optical communication signal by the first HB2O relay responsive to the receiving, such that the optical communication signal has the data stream encoded thereon; and
transmitting the optical communication signal through the window by the first HB2O relay via a wireless optical communication link that optically couples the first HB2O relay with the second HB2O relay.

11. The method of claim 10, wherein:
the first HB-RF communication signal is received in a first frequency band, and the optical communication signal is transmitted in a second frequency band; and
the window is substantially opaque to the first frequency band and substantially transparent to the second frequency band.

12. The method of claim 10, further comprising:
receiving the optical communication signal by the second HB2O relay via the wireless optical communication link;
converting the optical communication signal to a second HB-RF communication signal by the second HB2O relay responsive to the receiving the optical communication signal, such that the second HB-RF communication signal has the data stream encoded thereon; and
transmitting the second HB-RF communication signal by the second HB2O relay via a second HB-RF communication network on a second side of the window.

13. The method of claim 12, wherein the first HB-RF communication signal and the second HB-RF communication signal are transmitted in a same frequency band.

14. A system for through-window relaying of high-band wireless communication signals, the system comprising:
a first high-band-to-optical (HB2O) relay, comprising:
an alignment subsystem, comprising a first set of at least four magnets arranged in a rectangular pattern, that interfaces with a second set of at least four magnets of a second HB2O relay through a window, wherein:
an optical transceiver transmits and receives optical communication signals within the rectangular pattern formed by the first set of magnets; and
the first set of at least four magnets and the second set of at least four magnets are configured to:
cooperatively provide alignment between the optical transceiver and a second optical transceiver of the second HB2O relay; and
hold the first HB2O relay and the second HB2O relay in place against opposite sides of the window;
one or more processors; and
non-transient processor-readable memory having instructions stored thereon, which, when executed, cause the one or more processors to perform steps comprising:
receiving a first high-band radiofrequency (HB-RF) communication signal by the first HB2O relay via a first wireless HB-RF communication network, the first HB-RF communications signal encoding a data stream;
converting the first HB-RF communication signal to an optical communication signal by the first HB2O relay responsive to the receiving, such that the optical communication signal has the data stream encoded thereon; and
transmitting the optical communication signal by the first HB2O relay via a wireless optical communication link that optically couples the first HB2O relay with the second HB2O relay.

15. The system of claim 14, wherein:
the one or more processors and the non-transient processor-readable memory are disposed in a housing configured to be mounted on a pane face of the window;
the HB-RF communication signal is received in a first frequency band, and the optical communication signal is transmitted in a second frequency band; and
the window is substantially opaque to the first frequency band and substantially transparent to the second frequency band.

16. The system of claim 14, wherein the instructions, when executed, cause the one or more processors to perform steps further comprising:
receiving the optical communication signal by the second HB2O relay via the wireless optical communication link;
converting the optical communication signal to a second HB-RF communication signal by the second HB2O relay responsive to the receiving the optical communication signal, such that the second HB-RF signal has the data stream encoded thereon; and
transmitting the second HB-RF communication signal by the second HB2O relay via a second wireless HB-RF communication network at least partially communicatively isolated from the first wireless HB-RF communication network.

17. The system of claim 16, wherein the first HB-RF communication signal and the second HB-RF communication signal are transmitted in a same frequency band.

18. The system of claim 16, wherein the one or more processors comprises a high-band controller coupled with a high-band antenna to dynamically direct operation of the high-band antenna.

* * * * *